United States Patent
Yasumatsu et al.

(10) Patent No.: US 11,096,408 B2
(45) Date of Patent: Aug. 24, 2021

(54) YEAST EXTRACT HAVING TASTE-ENHANCING EFFECT

(75) Inventors: Yoshie Yasumatsu, Oita (JP); Hiroko Kodera, Oita (JP); Kenichi Ason, Oita (JP)

(73) Assignee: MITSUBISHI CORPORATION LIFE SCIENCES LIMITED, Tokyo (JP)

( * ) Notice: Subject to any disclaimer, the term of this patent is extended or adjusted under 35 U.S.C. 154(b) by 313 days.

(21) Appl. No.: 14/240,834

(22) PCT Filed: Aug. 21, 2012

(86) PCT No.: PCT/JP2012/071023
§ 371 (c)(1),
(2), (4) Date: Feb. 25, 2014

(87) PCT Pub. No.: WO2013/031571
PCT Pub. Date: Mar. 7, 2013

(65) Prior Publication Data
US 2014/0234526 A1    Aug. 21, 2014

(30) Foreign Application Priority Data

Aug. 26, 2011   (JP) .............................. JP2011-184989
Sep. 13, 2011   (JP) .............................. JP2011-199527
Dec. 14, 2011   (JP) .............................. JP2011-273616
Jan. 16, 2012   (JP) .............................. JP2012-005886
Mar. 2, 2012    (JP) .............................. JP2012-046950

(51) Int. Cl.
| | | |
|---|---|---|
| *A23L 5/00* | (2016.01) | |
| *A23L 33/125* | (2016.01) | |
| *A23L 31/15* | (2016.01) | |
| *A23L 2/56* | (2006.01) | |
| *A23G 1/48* | (2006.01) | |
| *A23G 1/42* | (2006.01) | |
| *A23L 27/60* | (2016.01) | |
| *A23L 27/24* | (2016.01) | |
| *A23L 23/00* | (2016.01) | |
| *A23L 33/145* | (2016.01) | |
| *A23L 27/00* | (2016.01) | |
| *A23L 7/00* | (2016.01) | |
| *A23L 9/00* | (2016.01) | |

(52) U.S. Cl.
CPC .............. *A23L 5/00* (2016.08); *A23G 1/423* (2013.01); *A23G 1/48* (2013.01); *A23L 2/56* (2013.01); *A23L 23/00* (2016.08); *A23L 27/24* (2016.08); *A23L 27/60* (2016.08); *A23L 27/88* (2016.08); *A23L 31/15* (2016.08); *A23L 33/125* (2016.08); *A23L 33/145* (2016.08); *A23L 7/00* (2016.08); *A23L 9/00* (2016.08)

(58) Field of Classification Search
CPC ...... A23L 1/3018; A23L 2/56; A23L 1/22091; A23L 1/221; A23G 1/423; A23G 1/48
See application file for complete search history.

(56) References Cited

U.S. PATENT DOCUMENTS

| | | | | |
|---|---|---|---|---|
| 3,914,450 A | * | 10/1975 | Robbins ................. | C12N 1/005 426/533 |
| 5,000,977 A | | 3/1991 | Marggrander | |
| 5,085,883 A | * | 2/1992 | Garleb et al. ................ | 426/590 |
| 2005/0054058 A1 | * | 3/2005 | Ikeuchi ................... | A23L 27/23 435/71.1 |
| 2006/0263415 A1 | * | 11/2006 | Sedmak ................... | A61K 8/73 424/442 |

FOREIGN PATENT DOCUMENTS

| | | |
|---|---|---|
| EP | 2 256 184 | 12/2010 |
| JP | 52-090684 | 7/1977 |
| JP | 63-3766 | 1/1988 |
| JP | 2-79954 | 3/1990 |
| JP | 5-292916 | 11/1993 |
| JP | 6-335362 | 12/1994 |
| JP | 7-289198 | 11/1995 |
| JP | 11-196859 | 7/1999 |
| JP | 2005-204617 | 8/2005 |
| JP | 2005-245438 | 9/2005 |
| JP | 2006-61066 | 3/2006 |
| JP | 2007-049988 | 3/2007 |
| JP | 4115453 | 4/2008 |
| JP | 2009-44978 | 3/2009 |
| JP | 2009-207464 | 9/2009 |
| JP | 2011-4673 | 1/2011 |
| JP | 2011-234643 | 11/2011 |

OTHER PUBLICATIONS

Sombutyanuchit, et al. Preparation of 5'-GMP-rich yeast extrats from spent brewer's yeast, World Journal of Mirobiology & Biotechnology 17: 163-168, 2001.*
IUPAC, Gold Book, amino-acid residue in a polypeptide, accessed at http://goldbook.iupac.org/html/A/A00279.html[Jun. 22, 2017 6:55:36 PM], last updated Feb. 24, 2014.*
U.S. Appl. No. 14/355,028 to Kenichi Ason et al., filed Apr. 29, 2014.
International Search Report PCT/JP2012/071023 dated Sep. 25, 2012, including English version.

* cited by examiner

*Primary Examiner* — Amber R Orlando
*Assistant Examiner* — Philip A Dubois
(74) *Attorney, Agent, or Firm* — Greenblum & Bernstein, P.L.C.

(57) ABSTRACT

The present invention addresses enhancing a taste of common processed food and drink without imparting a foreign taste and without increasing calories or sodium content. In such a case, a substance added to the common processed food and drink is preferably a common foodstuff, and preferably has a high degree of safety. A yeast extract having a peptide content of 5 wt % or more, an RNA content of 5 wt % or more, a free amino acid content of 4 wt % or less, and more preferably having a dietary fiber content of 15 wt % or more is added in an appropriate amount to the common processed food and drink.

13 Claims, No Drawings

YEAST EXTRACT HAVING TASTE-ENHANCING EFFECT

FIELD OF THE INVENTION

The present invention relates to a yeast extract that, through addition to a food, enhances a taste of the food.

BACKGROUND OF THE INVENTION

The sense of taste includes five basic tastes: sweet, sour, salty, bitter, and umami (savory). How good a food tastes is determined by a complex interplay of additional factors such as richness, aroma, texture, and the balance between them. In addition, factors increasing palatability vary for different foods. In dairy products such as butter and cream, a characteristic sense of body improves how good the food tastes, while in noodle sauce, ramen soup, and the like, the richness from the ingredients improves how good the food tastes. Therefore, in order to increase palatability in processed food and drink, the above-noted elements of taste must be incorporated in an appropriate balance. However, problems often arise.

For example, sweeteners used in food include carbohydrate sweeteners (such as naturally derived glucose and fructose) and high intensity sweeteners (such as aspartame and stevia). However, although carbohydrate sweeteners have preferable taste quality, they are high in calories. There is thus a tendency in recent health consciousness to refrain from adding such sweeteners in situations requiring low calories or no calories. When an amount of the carbohydrate sweetener is reduced, the calories decrease, but a level of satisfaction with the taste suffers. Meanwhile, high intensity sweeteners need only be used in small amounts, and therefore are preferable in situations requiring low calories or no calories. However, high intensity sweeteners generally have problems in taste quality, such as associated astringency or sharpness, and often are not immediately substituted for carbohydrate sweeteners.

Table salt (sodium chloride) is widely used as a basic seasoning when seasoning food. However, excessive consumption of salt is known to be linked to adult diseases such as high blood pressure, stroke, and heart attack. Due to health consciousness in recent years, many low-sodium processed foods and drinks have been proposed and commercialized. However, because table salt is the backbone of flavor, foods with a reduced amount of salt (so-called reduced-sodium processed foods and drinks) are flawed by a level of satisfaction with food taste being reduced as well, due to insufficient salt.

Moreover, dairy products such as cheese and cream, which have a characteristic richness and signature body, are consumed by themselves and are used in savory processed items such as sauces made from cheese or cream, or in sweets such as cheesecake. Even in such processed items, the characteristic richness and body derived from milk contribute greatly to how good the processed item tastes. The characteristic richness and body of milk is believed to derive mainly from milk fat, and dairy products having intense richness and body are typically highly satisfying, but are also high in calories.

Thus, using a large amount of carbohydrate sweetener, table salt, or dairy product in an attempt to improve the flavor of a food causes problems on a cost front and on a health front. And when instead a small amount of these additives is used or an attempt is made to supplement with alternatives, a satisfying flavor quality cannot be obtained.

Due to the health consciousness of recent years, interest in low-calorie, low-sodium foods has increased and a method has been sought for enhancing a taste of these foods and increasing a consumer's level of satisfaction.

In order to resolve these problems, various methods have been considered. With respect to sweetness, a method has been published in Patent Literature 1 for enhancing sweetness by adding a yeast extract to sweet foods. However, the yeast extract contains a savory element such as a 5'-nucleotide and may impart savoriness, which may be detected as a foreign taste, depending on an additive amount and a substance to which the yeast extract is added. Therefore, a substance capable of naturally enhancing sweetness continues to be sought.

To date, various sodium substitutes and saltiness-enhancing substances have been proposed in order to supplement reduced-sodium foods. The sodium substitutes are substances which, of themselves, provide a salt flavor. Known examples include potassium salt, ammonium salt, magnesium salt, basic amino acid, and a peptide configured with a basic amino acid. However, potassium salt and magnesium salt are flawed by having a bitter taste in addition to the salt flavor, and have a characteristic aftertaste. A salt flavor-enhancing substance is a substance that cannot be substituted for table salt, but that reduces an amount of salt used and enables sodium reduction by enhancing the salt flavor of table salt. Examples include a peptide obtained by hydrolyzing a collagen having a molecular weight of 50,000 daltons or less (Patent Literature 2), a protein hydrolysate of various protein substances (Patent Literature 3), and the like. However, even these have a low intensity of saltiness, may produce chloropropanols (which are carcinogenic substances) due to protein hydrolysis, and the like, and thus a reduced-sodium technique meeting consumer need continues to be sought. In this way, methods using a table salt substitute and methods using a salt flavor enhancer have been proposed in large numbers as a method for reduced sodium. However, no method for reduced sodium has yet been discovered that can meet criteria of palatability, effect, economy, safety, and the like. A method for reduced sodium resolving the above-noted problems continues to be strongly desired.

With regard to dairy products, various seasonings have been discovered that use a yeast extract. Patent Literature 4 discloses that heating and then drying dextrin and a yeast extract has an effect of imparting milkiness. Further, Patent Literature 5 discloses a method for obtaining a seasoning for a dairy product by inducing a thermal reaction in a fruit juice and a yeast extract. However, these methods require a complex step of inducing a thermal reaction in dextrin, fruit juice, or the like and the yeast extract. Patent Literature 6 discloses a method for imparting richness to a food using a yeast extract. However, the yeast extract disclosed in the reference cannot be said to have a satisfactory effect of imparting richness to a dairy product and, when added in an amount sufficient to impart richness, the yeast extract contains a large amount of free amino acids. There is therefore a problem of a striking savory flavor that is detected as a foreign taste. In addition, in order to obtain the yeast extract, a step is required in which protease processing is further performed following extraction from yeast cell bodies.

Meanwhile, there are also cases where sourness determines how good a food tastes. Foods having a sour flavor are typically widespread throughout the world, and how good those foods taste is greatly influenced by a quality of the sourness. In particular, a sharp, intense sourness tends to be sought for dressings and ponzu, and in foods using fruit juice such as juice from a lemon or kabosu, a sense of the fruit juice used is another element in how good the food tastes. To date, methods have been investigated for enhancing the sense of a fruit juice, or the sourness of a food having a sour flavor. Patent Literature 7 discloses a method for enhancing sourness and the sense of a fruit juice by enhancing a top note of a food using prenyl ethyl ether. Patent Literature 8 discloses a method for enhancing a flavor of a fruit juice using a yeast extract. However, in the method according to Patent Literature 7, a fragrance (an active ingredient in enhancing sourness) is obtained by being highly purified from a chemical composition which is a food additive, or from a natural substance, and is expensive. The method according to Patent Literature 8 is a method for enhancing the flavor of a citrus fruit juice using the yeast extract. However, no description is given of enhancing sourness.

Moreover, richness, which is not classified in the five basic tastes, is an important element influencing how good a food tastes. Therefore, various methods have been considered for enhancing the richness within a food. One known example of a substance having a richness-imparting effect is a yeast extract, such as in Patent Literature 9 and Patent Literature 10. However, these methods use a taste of the yeast extract itself to impart richness to the food and have the problem that, depending on the food to which the yeast extract is added or on an amount of yeast extract added, the flavor of the yeast extract is often detected as a foreign taste.

In this way, although investigations have been conducted into methods for enhancing various tastes of food, a taste-enhancing method that improves a level of consumer satisfaction is still desired.

RELATED ART

Patent Literature

Patent Literature 1: Japanese Patent Laid-open Publication No. 2009-44978
Patent Literature 2: Japanese Patent Laid-open Publication No. S63-3766
Patent Literature 3: Japanese Patent Laid-open Publication No. H7-28918
Patent Literature 4: Japanese Patent Laid-open Publication No. 2011-4673
Patent Literature 5: Japanese Patent Laid-open Publication No. 2006-61066
Patent Literature 6: Japanese Patent Publication No. 4115453
Patent Literature 7: Japanese Patent Laid-open Publication No. 2005-204617
Patent Literature 8: Japanese Patent Laid-open Publication No. H6-335362
Patent Literature 9: Japanese Patent Laid-open Publication No. 2009-44978
Patent Literature 10: Japanese Patent Laid-open Publication No. 2005-245438

SUMMARY OF THE INVENTION

Problems to be Solved by the Invention

A problem to be solved is to naturally enhance a taste and improve a level of satisfaction without imparting a foreign taste to common processed food and drink, and without increasing calories or sodium content. In such a case, a substance added to the common processed food and drink is preferably a common foodstuff, and preferably has a high degree of safety.

Means for Solving the Problems

As a result of thorough research to resolve the above-noted problems, the inventors of the present invention have discovered that adding a yeast extract having a specific composition has an effect of enhancing sweetness, saltiness, sourness, richness, and milk body, depending on a food to which the yeast extract is added, without greatly affecting taste quality. Specifically, the present invention relates to:

(1) A yeast extract containing 5 wt % or more of a peptide, 5 wt % or more of RNA, and 4 wt % or less of free amino acids;
(2) A yeast extract according to (1), wherein the yeast extract contains 15 wt % or more of dietary fiber;
(3) A method of enhancing a taste of food, wherein the yeast extract according to (1) or (2) is added to a food;
(4) A yeast extract for enhancing a taste of food, wherein the yeast extract is the yeast extract according to (1) or (2); and
(5) An agent enhancing a taste of food, wherein the yeast extract according to (1) or (2) is an active ingredient.

Effect of the Invention

According to the present invention, simply by adding a small amount of yeast extract, which is a common foodstuff, to common processed food and drink, various kinds of tastes can be enhanced, depending on the food, without imparting a foreign flavor. Specifically, with regard to sweet food, sweetness derived from carbohydrate sweeteners (such as glucose and fructose), sugar alcohols (such as xylitol), and high intensity sweeteners (such as aspartame and stevia) can be enhanced. Saltiness can be enhanced for common processed food and drink, including reduced sodium processed food and drink. With regard to dairy products, the richness and body of milk can be enhanced. With regard to sour foods, sourness can be enhanced. Moreover, the richness in common processed food and drink can be enhanced. Common processed food and drink having taste enhanced in this way deliver a fully satisfying flavor even with low sugar, low fat, and low sodium, and therefore contribute to the health of a person consuming the food and drink, and also to reducing costs.

The yeast extract is a common foodstuff and has a low allergenic quality, and is therefore a highly safe taste-enhancing agent.

MODE FOR CARRYING OUT THE INVENTION

A detailed description of the present invention is given below.

A yeast extract according to the present invention contains 5 wt % or more of a peptide, preferably 10 wt % or more of the peptide, and more preferably 16 wt % or more of the peptide; contains 5 wt % or more of RNA, preferably 10 wt % or more of RNA, and more preferably 25 wt % or more of RNA; and contains 4 wt % or less of free amino acids, and more preferably 2 wt % or less of the free amino acids. A yeast extract having a composition other than this either has a deficient taste-enhancing effect on processed food and drink or affects taste quality, and is therefore not preferred. More preferably, in addition to the above-noted conditions, the yeast extract contains 15 wt % or more of dietary fiber.

The yeast extract used in the present invention is extracted from yeast cell bodies preferably containing 6.5 wt % or more of RNA.

A method of increasing an amount of RNA contained in the yeast cell bodies is publicly known and is, for example, recited in Japanese Patent Laid-open Publication No. S52-90684, Japanese Patent Laid-open Publication No. 11-196859, and Japanese Patent Laid-open Publication No. 2009-207464.

After cultivation, harvesting, and cleaning of such yeast cell bodies, an extract obtained by deactivating enzymes within the yeast cell bodies using hot water and, thereafter, adding a cell wall lytic enzyme can be produced through condensation, pasteurization, and drying. When a nucleolytic enzyme or a protease act on the extract, RNA content and peptide content are unlikely to reach a specified amount, and therefore this is not preferred.

In a case where the RNA content and peptide content in the yeast extract do not reach the specified amount, concentration may be performed with a known method, while in a case where there are excessive free amino acids in the yeast extract, the free amino acids may be removed with a known purification method.

The yeast extract obtained in this way enhances taste when added to food and drink, and the yeast extract has no intrinsic sweetness, saltiness, sourness, savoriness, milk body, or richness.

Examples of the yeast used in producing the yeast extract of this kind include baker's yeast, brewer's yeast (*Saccharomyces cerevisiae*), and Torula yeast (*Candida utilis*). Use of Torula yeast is preferred, the Torula yeast generally containing the highest amount of RNA among these yeasts.

Moreover, the peptide of the present invention refers to two or more amino acids having a peptide bond. The peptide content is calculated by subtracting the amount of free amino acids from a total amount of amino acids.

Examples of the common processed food and drink that can be used with the present invention include sweets such as chocolate, ice cream, pudding, syrup, pastry cream, cream, and cookies; condiments such as miso, soy sauce, broth, gravy, sauce, dressing, and mayonnaise; dairy products such as low-fat milk, dairy cream, powdered fat-free milk, processed cheese, butter, gratin, and white sauce; meat products such as ham and sausage; seafood products such as kamaboko fish cake and fish sausage; agricultural products such as pickles and soy sauce pickles; and various foods such as soup, meat extract, seafood extract, and fruit juice.

An amount of yeast extract added to the processed food and drink is commonly 0.01 to 5 wt %, is preferably 0.03 to 1 wt %, and is more preferably 0.05 to 0.3 wt %. When in this range, the taste of the processed food and drink can be naturally enhanced. When an additive amount is less than 0.01%, the taste-enhancing effect is difficult to distinguish, and when the processed food and drink contain more than 5%, the inherent flavor of the yeast extract becomes noticeable and is also not preferred in terms of cost.

WORKING EXAMPLES

The present invention is described in detail in working examples below. The present invention, however, is not limited to the following embodiments.

Various measurement methods and testing methods in the working examples are as follows:

<Method for Measuring Free Amino Acid Content>

A yeast extract sample dissolved in a 0.02 N HCl was used as a measurement sample. The sample was measured using an amino acid analyzer (Hitachi high-speed amino acid analyzer L-8900).

<Method for Measuring Total Amino Acid Content>

A yeast extract sample was dissolved in a 6 N HCl then left to stand at 110° C. for 24 hours to hydrolyze. A portion of the sample was diluted in a 0.02 N HCl and used as a total amino acid measurement sample. The sample was measured using an amino acid analyzer (Hitachi high-speed amino acid analyzer L-8900).

<Method for Measuring Peptide Content>

A peptide content is calculated by subtracting the free amino acid content from the total amino acid content.

<Method for Measuring RNA Content>

A yeast extract sample dissolved in superpure water was used as a measurement sample, then a measurement was conducted using an HPLC method. An Asahipak HPLC column GS-320H was used as a column, and 0.1 M of a sodium phosphate buffer was used as an eluent. A detection wavelength was set to 260 nm.

<Method for Measuring Dietary Fiber Content>

Measurement was conducted at the Japan Food Research Laboratories using an enzymatic-gravimetric method.

<Method for Sensory Analysis>

A sensory analysis of food taste was conducted with five panelists for a working example sample and a comparative example sample. Intensity of sweetness, saltiness, sourness, richness, and milk body was evaluated in comparison to the taste of a control sample.

<Production Example 1> Method of Obtaining Yeast Extract

Using a 10 N sulfuric acid, 1000 ml of a 10% cell body suspension of *Candida utilis* CS 7529 strain (FERM BP-1656) was adjusted to a pH of 3.5, then was subjected to a heat treatment at 60° C. for 30 minutes, after which the cell bodies were collected via centrifugal separation and cleaned with water to remove the sulfuric acid and superfluous extracts. After the cell bodies were adjusted to a cell body concentration of 10% and suspended using water, a heat treatment was performed at 90° C. for 30 minutes; enzymes within the cell bodies were completely deactivated; the suspension was adjusted to 40° C. and a pH of 7.0; 0.5 g of a cell wall lytic enzyme ("Tunicase," manufactured by Daiwa kasei) was added thereto to react for four hours; and the extract was extracted. Cell body residue was removed by centrifugal separation, then a supernatant fluid thus obtained was condensed and spray-dried to obtain 30 g of yeast extract powder. The obtained yeast extract (hereafter referred to as "yeast extract 1") contained 18.7 wt % of peptide, 30.4 wt % of RNA, 0.5 wt % of free amino acid, and 22.7 wt % of dietary fiber. By adding the obtained yeast extract to common processed food, the taste of the food can be enhanced.

<Working Example 1> Effect on Chocolate

The yeast extract 1 (peptide content 18.7 wt %; RNA content 30.4 wt %; free amino acid content 0.5 wt %; dietary fiber content 22.7 wt %) and commercially available chocolate were added at composition ratios shown in Table 1, then were dissolved in a double boiler and re-hardened. This was then used as a sample for evaluation.

Comparative Example 1

Comparative example 1 was conducted in the same manner as working example 1, except that a yeast extract 2 (peptide content 22.09 wt %; RNA content 0.00 wt %; free amino acid content 1.26%; dietary fiber content 33.3 wt %) was used instead of the yeast extract 1 in working example 1.

Comparative Example 2

Comparative example 2 was conducted in the same manner as working example 1, except that a yeast extract 3 (peptide content 24.41 wt %; RNA content 11.23 wt %; free amino acid content 4.9 wt %) was used instead of the yeast extract 1 in working example 1.

<Control>

A control chocolate sample was produced in the same manner as working example 1, except that the yeast extract 1 was not added to the composition of working example 1.

TABLE 1

| Name of Ingredient | Control | Working Example 1 | Comparative Example 1 | Comparative Example 2 |
| --- | --- | --- | --- | --- |
| Chocolate | 100.0 g | 100.0 g | 100.0 g | 100.0 g |
| Yeast Extract 1 | — | 0.3 g | — | — |
| Yeast Extract 2 | — | — | 0.3 g | — |
| Yeast Extract 3 | — | — | — | 0.3 g |
| Total | 100.0 g | 100.3 g | 100.3 g | 100.3 g |

The results of conducting the sensory analysis were that, as a result of comparing each evaluation sample with the control sample, the sweetness of the chocolate was felt to be enhanced and milkiness was improved in working example 1. In addition, the chocolate was full-bodied on the tongue and an aftertaste retained the feeling of body. In comparative example 1, savoriness was detected in the aftertaste, which was not preferred. In comparative example 2, savoriness was imparted and a characteristic flavor of yeast was detected, which were not preferred.

<Working Example 2> Effect of Addition to Pastry Cream

Various ingredients were weighed in a stainless steel mug at the composition ratios shown in Table 2. After heating the ingredients to 60° C. while mixing the ingredients together, the ingredients were stirred together for 5 minutes at 5000 rpm by a homogenizing mixer (Labolution Homogenizing Mixer Mark II Model 2.5, manufactured by Primix Corporation). After being stirred and heated for ten minutes in a boiling solution, the ingredients were put on ice while stirring and cooling to 60° C. A cup was then filled and the ingredients therein cooled to serve as a control pastry cream. The yeast extract 1 (peptide content 18.7 wt %; RNA content 30.4 wt %; free amino acid content 0.5 wt %; dietary fiber content 22.7 wt %) was added at 0.3 g and mixed together with 100 g of the control pastry cream. This was then used as an evaluation sample for working example 2.

Comparative Example 3

Comparative example 3 was conducted in the same manner as working example 2, except that the yeast extract 2 (peptide content 22.09 wt %; RNA content 0.00 wt %; free amino acid content 1.26%; dietary fiber content 33.3 wt %) was used instead of the yeast extract 1 in working example 2.

Comparative Example 4

Comparative example 4 was conducted in the same manner as working example 2, except that the yeast extract 3 (peptide content 24.41 wt %; RNA content 11.23 wt %; free amino acid content 4.9 wt %) was used instead of the yeast extract 1 in working example 2.

TABLE 2

| Name of Ingredient | Control | Working Example 2 | Comparative Example 3 | Comparative Example 4 |
| --- | --- | --- | --- | --- |
| Milk | 63.0 g | 63.0 g | 63.0 g | 63.0 g |
| Superfine sugar | 12.0 g | 12.0 g | 12.0 g | 12.0 g |
| Egg yolk | 10.0 g | 10.0 g | 10.0 g | 10.0 g |
| Starch syrup | 9.0 g | 9.0 g | 9.0 g | 9.0 g |
| Cornstarch | 4.0 g | 4.0 g | 4.0 g | 4.0 g |
| Weak flour | 1.0 g | 1.0 g | 1.0 g | 1.0 g |
| Glycine | 1.0 g | 1.0 g | 1.0 g | 1.0 g |
| Yeast Extract 1 | — | 0.3 g | — | — |
| Yeast Extract 2 | — | — | 0.3 g | — |
| Yeast Extract 3 | — | — | — | 0.3 g |
| Total | 100.0 g | 100.3 g | 100.3 g | 100.3 g |

The results of conducting the sensory analysis were that the sweetness of the pastry cream was felt to be enhanced and a strong egg flavor was also detected in working example 2. In addition, the aftertaste retained the feeling of body. In comparative examples 3 and 4, savoriness was imparted and a characteristic flavor of yeast was detected, which were not preferred.

<Working Example 3> Effect of Addition to Milk Pudding

The yeast extract 1 (peptide content 18.7 wt %; RNA content 30.4 wt %; free amino acid content 0.5 wt %; dietary fiber content 22.7 wt %) and various ingredients were weighed in a beaker at the composition ratios shown in Table 3. After heating the ingredients to 80° C. while mixing the ingredients together, a cup was filled with the ingredients and cooled to serve as the evaluation sample.

Comparative Example 5

Comparative example 5 was conducted in the same manner as working example 3, except that the yeast extract 2 (peptide content 22.09 wt %; RNA content 0.00 wt %; free amino acid content 1.26 wt %; dietary fiber content 33.3 wt %) was used instead of the yeast extract 1 in working example 3.

Comparative Example 6

Comparative example 6 was conducted in the same manner as working example 3, except that the yeast extract 3 (peptide content 24.41 wt %; RNA content 11.23 wt %; free amino acid content 4.9 wt %) was used instead of the yeast extract 1 in working example 3.

<Control>

A control milk pudding sample was produced in the same manner as working example 3, except that the yeast extract 1 was not added to the composition of working example 3.

TABLE 3

| | Control | Working Example 3 | Comparative Example 5 | Comparative Example 6 |
| --- | --- | --- | --- | --- |
| Granulated sugar | 10.0 g | 10.0 g | 10.0 g | 10.0 g |
| Dairy cream | 10.0 g | 10.0 g | 10.0 g | 10.0 g |
| Vegetable fat and oil | 10.0 g | 10.0 g | 10.0 g | 10.0 g |

TABLE 3-continued

|  | Control | Working Example 3 | Comparative Example 5 | Comparative Example 6 |
|---|---|---|---|---|
| Powdered fat-free milk | 3.0 g | 3.0 g | 3.0 g | 3.0 g |
| Thickener | 0.5 g | 0.5 g | 0.5 g | 0.5 g |
| Water | 66.5 g | 66.5 g | 66.5 g | 66.5 g |
| Yeast Extract 1 | — | 0.1 g | — | — |
| Yeast Extract 2 | — | — | 0.1 g | — |
| Yeast Extract 3 | — | — | — | 0.1 g |
| Total | 100.0 g | 100.1 g | 100.1 g | 100.1 g |

The results of conducting the sensory analysis and comparing each evaluation sample with the control sample were that the sweetness was felt to be enhanced and a strong milky flavor was detected in working example 3. In comparative examples 5 and 6, savoriness was imparted and a characteristic flavor of yeast was detected, which were not preferred.

<Working Example 4> Effect of Addition to Worcestershire Sauce

Commercially available Worcestershire sauce (manufacturer: AEON Co., Ltd.) was used as the control. The yeast extract 1 (peptide content 18.7 wt %; RNA content 30.4 wt %; free amino acid content 0.5 wt %; dietary fiber content 22.7 wt %) obtained with production example 1 was added at 0.1 g and dissolved in 100.0 g of the Worcestershire sauce. This was then used as an evaluation sample for working example 4. Ingredients of the commercially available Worcestershire sauce were vegetables, fruits (tomato, onion, apple, carrots), fermented vinegar, sugar, table salt, hydrolyzed vegetable proteins (including soy), spices, yeast extract, caramel coloring, seasonings (such as amino acids), and spice extracts.

Comparative Example 7

Comparative example 7 was conducted in the same manner as working example 4, except that the yeast extract 2 (peptide content 22.09 wt %; RNA content 0.00 wt %; free amino acid content 1.26%; dietary fiber content 33.3 wt %) was used instead of the yeast extract 1 in working example 4. This was then used as an evaluation sample for comparative example 7.

Comparative Example 8

Comparative example 8 was conducted in the same manner as working example 4, except that the yeast extract 3 (peptide content 24.41 wt %; RNA content 11.23 wt %; free amino acid content 4.9 wt %) was used instead of the yeast extract 1 in working example 4. This was then used as an evaluation sample for comparative example 8. Composition ratios of working example 4, comparative example 7, and comparative example 8 are shown in Table 4.

TABLE 4

| Name of Ingredient | Control | Working Example 4 | Comparative Example 7 | Comparative Example 8 |
|---|---|---|---|---|
| Worcestershire sauce | 100.0 g | 100.0 g | 100.0 g | 100.0 g |
| Yeast Extract 1 | — | 0.1 g | — | — |
| Yeast Extract 2 | — | — | 0.1 g | — |
| Yeast Extract 3 | — | — | — | 0.1 g |
| Total | 100.0 g | 100.1 g | 100.1 g | 100.1 g |

The results of conducting the sensory analysis and comparing the evaluation samples of working example 4, comparative example 7, and comparative example 8, respectively, with the control sample were that, in working example 4, saltiness and sourness were felt to be enhanced in comparison to the control. When compared to working example 4, comparative examples 7 and 8 had poor saltiness- and sourness-enhancing effects, and savoriness was felt to be enhanced in comparison to the control. In comparative example 8, this was not preferred.

<Working Example 5> Effect of Addition to Carbonara Sauce

A carbonara sauce was made with the composition ratios shown in Table 5.

Vegetable oil was poured into a frying pan and bacon was fried, then wheat flour was added and the ingredients mixed together. The remaining ingredients were then added and brought to a boil to make a carbonara sauce, which was used as the control.

The yeast extract 1 (peptide content 18.7 wt %; RNA content 30.4 wt %; free amino acid content 0.5 wt %; dietary fiber content 22.7 wt %) was added at 0.3 g and mixed together with 100 g of the control carbonara sauce. This was then used as an evaluation sample for working example 5.

Comparative Example 9

Comparative example 9 was conducted in the same manner as working example 5, except that the yeast extract 2 (peptide content 22.09 wt %; RNA content 0.00 wt %; free amino acid content 1.26%; dietary fiber content 33.3 wt %) was used instead of the yeast extract 1 in working example 5. This was then used as an evaluation sample for comparative example 9.

Comparative Example 10

Comparative example 10 was conducted in the same manner as working example 5, except that the yeast extract 3 (peptide content 24.41 wt %; RNA content 11.23 wt %; free amino acid content 4.9 wt %) was used instead of the yeast extract 1 in working example 5. This was then used as an evaluation sample for comparative example 10.

TABLE 5

| Name of Ingredient | Control | Working Example 5 | Comparative Example 9 | Comparative Example 10 |
|---|---|---|---|---|
| Enzyme-treated egg yolk | 10.00 g | 10.00 g | 10.00 g | 10.00 g |
| Bacon | 15.00 g | 15.00 g | 15.00 g | 15.00 g |
| Dairy cream | 12.00 g | 12.00 g | 12.00 g | 12.00 g |
| Vegetable oil | 3.00 g | 3.00 g | 3.00 g | 3.00 g |
| Wheat flour | 4.00 g | 4.00 g | 4.00 g | 4.00 g |
| Parmigiano-Reggiano powder | 5.00 g | 5.00 g | 5.00 g | 5.00 g |

TABLE 5-continued

| Name of Ingredient | Control | Working Example 5 | Comparative Example 9 | Comparative Example 10 |
|---|---|---|---|---|
| Table salt | 0.50 g | 0.50 g | 0.50 g | 0.50 g |
| Coarse black pepper | 0.20 g | 0.20 g | 0.20 g | 0.20 g |
| Additive water | 50.20 g | 50.20 g | 50.20 g | 50.20 g |
| Polyphosphate | 0.05 g | 0.05 g | 0.05 g | 0.05 g |
| Monoglyceryl fatty acid ester | 0.05 g | 0.05 g | 0.05 g | 0.05 g |
| Yeast Extract 1 | — | 0.30 g | — | — |
| Yeast Extract 2 | — | — | 0.30 g | — |
| Yeast Extract 3 | — | — | — | 0.30 g |
| Total | 100.00 g | 100.30 g | 100.30 g | 100.30 g |

The results of conducting the sensory analysis and comparing the evaluation samples of working example 5, comparative example 9, and comparative example 10, respectively, with the control sample were that, in working example 5, saltiness and milk body were felt to be enhanced in comparison to the control. When compared to working example 5, comparative examples 9 and 10 had a poor saltiness-enhancing effect, and savoriness was felt to be enhanced. In comparative example 10, a characteristic flavor of yeast was detected as a foreign taste and was not preferred.

<Working Example 6> Effect of Addition to Kabosu Ponzu

Commercially available kabosu ponzu (manufacturer: Fundokin Co., Ltd.) was used as the control. The yeast extract 1 (peptide content 18.7 wt %; RNA content 30.4 wt %; free amino acid content 0.5 wt %; dietary fiber content 22.7 wt %) was added at 0.1 g and dissolved in 100.0 g of the commercially available kabosu ponzu. This was then used as an evaluation sample for working example 6. Ingredients of the commercially available kabosu ponzu were soy sauce, sugar, isomerized liquid sugar, fermented vinegar, kabosu juice, protein hydrolysate, table salt, shiitake mushroom extract, acidifier, spices, and caramel coloring.

Comparative Example 11

Comparative example 11 was conducted in the same manner as working example 6, except that the yeast extract 2 (peptide content 22.09 wt %, RNA content 0.00 wt %, free amino acid content 1.26%, dietary fiber 33.3 wt %) was used instead of the yeast extract 1 in working example 6. This was then used as an evaluation sample for comparative example 11.

Comparative Example 12

Comparative example 12 was conducted in the same manner as working example 6, except that the yeast extract 3 (peptide content 24.41 wt %, RNA content 11.23 wt %, free amino acid content 4.9 wt %) was used instead of the yeast extract 1 in working example 6. This was then used as an evaluation sample for comparative example 12. Composition ratios of working example 6, comparative example 11, and comparative example 12 are shown in Table 6.

TABLE 6

| Name of Ingredient | Control | Working Example 6 | Comparative Example 11 | Comparative Example 12 |
|---|---|---|---|---|
| Kabosu ponzu | 100.0 g | 100.0 g | 100.0 g | 100.0 g |
| Yeast Extract 1 | — | 0.1 g | — | — |
| Yeast Extract 2 | — | — | 0.1 g | — |
| Yeast Extract 3 | — | — | — | 0.1 g |
| Total | 100.0 g | 100.1 g | 100.1 g | 100.1 g |

The results of conducting the sensory analysis of food taste and comparing the evaluation samples of working example 6, comparative example 11, and comparative example 12, respectively, with the control sample were that, in working example 6, saltiness and sourness of the ponzu were felt to be enhanced in comparison to the control and a depth was imparted to the flavor. In comparative examples 11 and 12, savoriness was imparted as compared to the control, but working example 6 was felt to have a stronger saltiness- and sourness-enhancing effect. In comparative example 12, a characteristic flavor of yeast was detected as a foreign taste and was not preferred.

<Working Example 7> Effect of Addition to Processed Cheese

The yeast extract 1 (peptide content 18.7 wt %; RNA content 30.4 wt %; free amino acid content 0.5 wt %; dietary fiber 22.7 wt %) and commercially available processed cheese ("Cheddar Slices," manufactured by MK Cheese Co., Ltd.) were added to a beaker at the composition ratios shown in Table 7, then were heated and melted in a home microwave oven. This was then cooled and solidified to be used as the evaluation sample. Ingredients of the processed cheese were natural cheese, whey powder, emulsifiers, and carotenoid coloring.

Comparative Example 13

Comparative example 13 was conducted in the same manner as working example 7, except that the yeast extract 2 (peptide content 22.09 wt %; RNA content 0.00 wt %; free amino acid content 1.26 wt %; dietary fiber content 33.3 wt %) was used instead of the yeast extract 1 in working example 7.

Comparative Example 14

Comparative example 14 was conducted in the same manner as working example 7, except that the yeast extract 3 (peptide content 24.41 wt %; RNA content 11.23 wt %; free amino acid content 4.9 wt %) was used instead of the yeast extract 1 in working example 7.

<Control>

A control processed cheese sample was produced in the same manner as working example 7, except that the yeast extract 1 was not added to the composition of working example 7.

TABLE 7

| Name of Ingredient | Control | Working Example 7 | Comparative Example 13 | Comparative Example 14 |
|---|---|---|---|---|
| Processed cheese | 100.0 g | 100.0 g | 100.0 g | 100.0 g |
| Yeast Extract 1 | — | 0.3 g | — | — |

TABLE 7-continued

| Name of Ingredient | Control | Working Example 7 | Comparative Example 13 | Comparative Example 14 |
|---|---|---|---|---|
| Yeast Extract 2 | — | — | 0.3 g | — |
| Yeast Extract 3 | — | — | — | 0.3 g |
| Total | 100.0 g | 100.3 g | 100.3 g | 100.3 g |

The results of conducting the sensory analysis and comparing each of the evaluation samples with the control sample were that, in working example 7, the body of the cheese was felt to be improved in comparison to the control. In comparative examples 13 and 14, savoriness and a foreign taste were imparted, causing a change in an inherent taste quality of the ingredients, and so comparative examples 13 and 14 were not particularly preferred.

<Working Example 8> Effect of Addition to Noodle Sauce

A noodle sauce was made with the composition ratios shown in Table 8.
Ingredients were weighed in a beaker and heated to 80° C. to produce a liquid concentrate of control noodle sauce. The yeast extract 1 (peptide content 18.7 wt %; RNA content 30.4 wt %; free amino acid content 0.5 wt %; dietary fiber content 22.7 wt %) was added at 0.05 g and mixed together with 100 g of the control noodle sauce. This was then used as a sample for working example 8.

Comparative Example 15

Comparative example 15 was conducted in the same manner as working example 8, except that the yeast extract 2 (peptide content 22.09 wt %; RNA content 0.00 wt %; free amino acid content 1.26%, dietary fiber content 33.3 wt %) was used instead of the yeast extract 1 in working example 8. This was then used as a sample for comparative example 15.

Comparative Example 16

Comparative example 16 was conducted in the same manner as working example 8, except that the yeast extract 3 (peptide content 24.41 wt %; RNA content 11.23 wt %; free amino acid content 4.9 wt %) was used instead of the yeast extract 1 in working example 8. This was then used as a sample for comparative example 16.

TABLE 8

| Name of Ingredient | Control | Working Example 8 | Comparative Example 15 | Comparative Example 16 |
|---|---|---|---|---|
| Koikuchi soy sauce | 35.00 g | 35.00 g | 35.00 g | 35.00 g |
| Table salt | 2.60 g | 2.60 g | 2.60 g | 2.60 g |
| Superfine sugar | 15.00 g | 15.00 g | 15.00 g | 15.00 g |
| Mirin | 18.00 g | 18.00 g | 18.00 g | 18.00 g |
| Concentrated bonito stock | 4.50 g | 4.50 g | 4.50 g | 4.50 g |
| Powdered bonito flake extract | 0.50 g | 0.50 g | 0.50 g | 0.50 g |
| Powdered kelp extract | 1.50 g | 1.50 g | 1.50 g | 1.50 g |
| Water | 22.90 g | 22.90 g | 22.90 g | 22.90 g |
| Yeast Extract 1 | — | 0.05 g | — | — |
| Yeast Extract 2 | — | — | 0.05 g | — |
| Yeast Extract 3 | — | — | — | 0.05 g |
| Total | 100.00 g | 100.05 g | 100.05 g | 100.05 g |

The sample produced with the above-noted method was diluted to one-sixth with water, after which the sensory analysis of food taste was conducted. The results of comparing the evaluation samples of working example 8, comparative example 15, and comparative example 16, respectively, with the control sample were that, in working example 8, overall richness was felt to be enhanced in comparison to the control, while in comparative examples 15 and 16, a richness-enhancing effect was poor in comparison to working example 8 and savoriness was felt to be enhanced.

<Working Example 9> Effect of Addition to Pork Bone Ramen Soup

A pork bone ramen soup was made with the composition ratios shown in Table 9. Ingredients were weighed, then dissolved in 100 ml of hot water to produce a control ramen soup. The yeast extract 1 (peptide content 18.7 wt %; RNA content 30.4 wt %; free amino acid content 0.5 wt %; dietary fiber content 22.7 wt %) was added at 0.05 g and mixed together with 100 ml of the control ramen soup. This was then used as an evaluation sample for working example 9.

Comparative Example 17

Comparative example 17 was conducted in the same manner as working example 9, except that the yeast extract 2 (peptide content 22.09 wt %; RNA content 0.00 wt %; free amino acid content 1.26%; dietary fiber content 33.3 wt %) was used instead of the yeast extract 1 in working example 9. This was then used as an evaluation sample for comparative example 17.

Comparative Example 18

Comparative example 18 was conducted in the same manner as working example 9, except that the yeast extract 3 (peptide content 24.41 wt %; RNA content 11.23 wt %; free amino acid content 4.9 wt %) was used instead of the yeast extract 1 in working example 9. This was then used as an evaluation sample for comparative example 18.

TABLE 9

| Name of Ingredient | Contol | Working Example 9 | Comparative Example 17 | Comparative Example 18 |
|---|---|---|---|---|
| Powdered pork extract | 2.500 g | 2.500 g | 2.500 g | 2.500 g |
| Powdered chicken extract | 1.000 g | 1.000 g | 1.000 g | 1.000 g |
| Powdered vegetable extract | 1.670 g | 1.670 g | 1.670 g | 1.670 g |
| Table salt | 0.670 g | 0.670 g | 0.670 g | 0.670 g |
| Powdered soy sauce | 0.270 g | 0.270 g | 0.270 g | 0.270 g |
| White pepper | 0.017 g | 0.017 g | 0.017 g | 0.017 g |
| Garlic powder | 0.007 g | 0.007 g | 0.007 g | 0.007 g |
| Ginger powder | 0.003 g | 0.003 g | 0.003 g | 0.003 g |
| Superfine sugar | 0.100 g | 0.100 g | 0.100 g | 0.100 g |
| Fermented umami seasoning | 0.135 g | 0.135 g | 0.135 g | 0.135 g |
| HVP | 0.135 g | 0.135 g | 0.135 g | 0.135 g |
| MSG | 0.050 g | 0.050 g | 0.050 g | 0.050 g |

TABLE 9-continued

| Name of Ingredient | Contol | Working Example 9 | Comparative Example 17 | Comparative Example 18 |
|---|---|---|---|---|
| Ribotide | 0.005 g | 0.005 g | 0.005 g | 0.005 g |
| Yeast Extract 1 | — | 0.100 g | — | — |
| Yeast Extract 2 | — | — | 0.100 g | — |
| Yeast Extract 3 | — | — | — | 0.100 g |
| Hot water | 100.000 g | 100.000 g | 100.000 g | 100.000 g |
| Total | 106.562 g | 106.662 g | 106.662 g | 106.662 g |

The results of conducting the sensory analysis and comparing the evaluation samples of working example 9, comparative example 17, and comparative example 18, respectively, with the control sample were that, in working example 9, richness of the soup was felt to be enhanced in comparison to the control, and an impression of extract concentration was improved. Although comparative examples 17 and 18 had a savoriness-imparting effect as compared to working example 9, working example 9 was felt to have a stronger richness-imparting effect.

<Working Example 10> Effect of Addition to Mayonnaise

A mayonnaise was made with the composition ratios shown in Table 10.
All ingredients other than the vegetable oil were measured in a stainless steel mug, then were mixed at 5000 rpm by a homogenizing mixer (Labolution Homogenizing Mixer Mark II Model 2.5, manufactured by Primix Corporation). While mixing, a small amount of the vegetable oil at a time was added to make a control mayonnaise. The yeast extract 1 (peptide content 18.7 wt %; RNA content 30.4 wt %; free amino acid content 0.5 wt %; dietary fiber content 22.7 wt %) was added at 0.05 g and mixed together with 100 g of the control mayonnaise. This was then used as an evaluation sample for working example 10.

Comparative Example 19

Comparative example 19 was conducted in the same manner as working example 10, except that the yeast extract 2 (peptide content 22.09 wt %; RNA content 0.00 wt %; free amino acid content 1.26%; dietary fiber content 33.3 wt %) was used instead of the yeast extract 1 in working example 10. This was then used as an evaluation sample for comparative example 19.

Comparative Example 20

Comparative example 20 was conducted in the same manner as working example 10, except that the yeast extract 3 (peptide content 24.41 wt %; RNA content 11.23 wt %; free amino acid content 4.9 wt %) was used instead of the yeast extract 1 in working example 10. This was then used as an evaluation sample for comparative example 20.

TABLE 10

| Name of Ingredient | Control | Working Example 10 | Comparative Example 19 | Comparative Example 20 |
|---|---|---|---|---|
| Vegetable oil | 70.00 g | 70.00 g | 70.00 g | 70.00 g |
| Egg yolk | 15.00 g | 15.00 g | 15.00 g | 15.00 g |
| Fermented vinegar | 12.00 g | 12.00 g | 12.00 g | 12.00 g |

TABLE 10-continued

| Name of Ingredient | Control | Working Example 10 | Comparative Example 19 | Comparative Example 20 |
|---|---|---|---|---|
| Table salt | 2.00 g | 2.00 g | 2.00 g | 2.00 g |
| Sugar | 0.75 g | 0.75 g | 0.75 g | 0.75 g |
| Mustard powder | 0.25 g | 0.25 g | 0.25 g | 0.25 g |
| Yeast Extract 1 | — | 0.05 g | — | — |
| Yeast Extract 2 | — | — | 0.05 g | — |
| Yeast Extract 3 | — | — | — | 0.05 g |
| Total | 100.00 g | 100.05 g | 100.05 g | 100.05 g |

The results of conducting the sensory analysis of food taste and comparing the evaluation samples of working example 10, comparative example 19, and comparative example 20, respectively, with the control sample were that, in working example 10, richness of the mayonnaise was felt to be enhanced in comparison to the control. In comparative examples 19 and 20, savoriness was imparted as compared to the control, but working example 10 was felt to have a stronger richness-enhancing effect.

<Working Example 11> Effect of Addition to Corn Cream Soup

Ingredients are weighed with a formulation shown in Table 11, then are dissolved in 100 ml of hot water to make a control corn cream soup. The yeast extract 1 (peptide content 18.7 wt %; RNA content 30.4 wt %; free amino acid content 0.5 wt %; dietary fiber content 22.7 wt %) obtained with production example 1 was added at 0.1 g to 100.0 g of the control corn cream soup and dissolved therein. This was then used as an evaluation sample for working example 11.

Comparative Example 21

Comparative example 21 was conducted in the same manner as working example 11, except that the yeast extract 2 (peptide content 22.09 wt %; RNA content 0.00 wt %; free amino acid content 1.26%; dietary fiber content 33.3 wt %) was used instead of the yeast extract 1 in working example 11. This was then used as an evaluation sample for comparative example 21.

Comparative Example 22

Comparative example 22 was conducted in the same manner as working example 11, except that the yeast extract 3 (peptide content 24.41 wt %; RNA content 11.23 wt %; free amino acid content 4.9 wt %) was used instead of the yeast extract 1 in working example 11. This was then used as an evaluation sample for comparative example 22. Composition ratios of working example 11, comparative example 21, and comparative example 22 are shown in Table 11.

TABLE 11

| Name of Ingredient | Control | Working Example 11 | Comparative Example 21 | Comparative Example 22 |
|---|---|---|---|---|
| Powdered sweet corn | 5.0 g | 5.0 g | 5.0 g | 5.0 g |
| Powdered cream | 2.0 g | 2.0 g | 2.0 g | 2.0 g |
| Starch | 1.8 g | 1.8 g | 1.8 g | 1.8 g |
| Lactose | 1.0 g | 1.0 g | 1.0 g | 1.0 g |
| Superfine sugar | 0.8 g | 0.8 g | 0.8 g | 0.8 g |
| Table salt | 0.8 g | 0.8 g | 0.8 g | 0.8 g |

TABLE 11-continued

| Name of Ingredient | Control | Working Example 11 | Comparative Example 21 | Comparative Example 22 |
|---|---|---|---|---|
| Powdered fat-free milk | 1.0 g | 1.0 g | 1.0 g | 1.0 g |
| Chicken powder | 0.2 g | 0.2 g | 0.2 g | 0.2 g |
| Powdered kelp extract | 0.2 g | 0.2 g | 0.2 g | 0.2 g |
| Powdered onion extract | 1.7 g | 1.7 g | 1.7 g | 1.7 g |
| MSG | 0.1 g | 0.1 g | 0.1 g | 0.1 g |
| Yeast Extract 1 | — | 0.1 g | — | — |
| Yeast Extract 2 | — | — | 0.1 g | — |
| Yeast Extract 3 | — | — | — | 0.1 g |
| Total | 15.1 g | 15.2 g | 15.2 g | 15.2 g |

The results of conducting the sensory analysis of food taste and comparing the evaluation samples of working example 11, comparative example 21, and comparative example 22, respectively, with the control sample were that, in working example 11, richness of the soup was improved and sweetness of the corn was felt to be particularly enhanced in comparison to the control. In comparative examples 21 and 22, although savoriness was felt to be enhanced as compared to the control, an effect of improving an overall taste of the soup was inferior as compared to working example 11.

<Working Example 12> Effect of Addition to Demi-Glace Sauce

A control demi-glace sauce was made with a formulation shown in Table 12. First, butter and wheat flour were added to a pot and sautéed well over medium heat. The remaining ingredients were then added and were boiled until thickened. The yeast extract 1 (peptide content 18.7 wt %; RNA content 30.4 wt %; free amino acid content 0.5 wt %; dietary fiber content 22.7 wt %) obtained with production example 1 was added at 0.1 g to 100.0 g of the demi-glace sauce and dissolved therein. This was then used as an evaluation sample for working example 12.

Comparative Example 23

Comparative example 23 was conducted in the same manner as working example 12, except that the yeast extract 2 (peptide content 22.09 wt %; RNA content 0.00 wt %; free amino acid content 1.26%; dietary fiber content 33.3 wt %) was used instead of the yeast extract 1 in working example 12. This was then used as an evaluation sample for comparative example 23.

Comparative Example 24

Comparative example 24 was conducted in the same manner as working example 12, except that the yeast extract 3 (peptide content 24.41 wt %; RNA content 11.23 wt %; free amino acid content 4.9 wt %) was used instead of the yeast extract 1 in working example 12. This was then used as an evaluation sample for comparative example 24. Composition ratios of working example 12, comparative example 23, and comparative example 24 are shown in Table 12.

TABLE 12

| Name of Ingredient | Control | Working Example 12 | Comparative Example 23 | Comparative Example 24 |
|---|---|---|---|---|
| Water | 35.70 g | 35.70 g | 35.70 g | 35.70 g |
| Tomato purée | 20.00 g | 20.00 g | 20.00 g | 20.00 g |
| Liquid sugar | 10.00 g | 10.00 g | 10.00 g | 10.00 g |
| Apple cider vinegar | 8.00 g | 8.00 g | 8.00 g | 8.00 g |
| Wheat flour | 3.00 g | 3.00 g | 3.00 g | 3.00 g |
| Superfine sugar | 8.00 g | 8.00 g | 8.00 g | 8.00 g |
| Roasted onion powder | 2.00 g | 2.00 g | 2.00 g | 2.00 g |
| Butter | 3.00 g | 3.00 g | 3.00 g | 3.00 g |
| Table salt | 3.00 g | 3.00 g | 3.00 g | 3.00 g |
| Powdered onion extract | 1.00 g | 1.00 g | 1.00 g | 1.00 g |
| White pepper | 0.10 g | 0.10 g | 0.10 g | 0.10 g |
| Allspice | 0.05 g | 0.05 g | 0.05 g | 0.05 g |
| Bay leaf | 0.05 g | 0.05 g | 0.05 g | 0.05 g |
| Thyme | 0.05 g | 0.05 g | 0.05 g | 0.05 g |
| Garlic powder | 0.05 g | 0.05 g | 0.05 g | 0.05 g |
| Dextrin | 2.00 g | 2.00 g | 2.00 g | 2.00 g |
| Beef extract | 3.00 g | 3.00 g | 3.00 g | 3.00 g |
| Protein hydrolysate | 1.00 g | 1.00 g | 1.00 g | 1.00 g |
| Yeast Extract 1 | — | 0.1 g | — | — |
| Yeast Extract 2 | — | — | 0.1 g | — |
| Yeast Extract 3 | — | — | — | 0.1 g |
| Total | 100.0 g | 100.1 g | 100.1 g | 100.1 g |

The results of conducting the sensory analysis of food taste and comparing the evaluation samples of working example 12, comparative example 23, and comparative example 24, respectively, with the control sample were that, in working example 12, sourness and saltiness of the sauce were felt to be enhanced and an overall impact was improved in comparison to the control. Although comparative examples 23 and 24 had a savoriness-imparting effect as compared to working example 12, sourness- and saltiness-enhancing effects were poor.

<Working Example 13> Effect of Addition to White Sauce

A control white sauce was made with a formulation shown in Table 13. First, butter and wheat flour were added to a pot and sautéed well over medium heat. The remaining ingredients were then added and were boiled until thickened. The yeast extract 1 (peptide content 18.7 wt %; RNA content 30.4 wt %; free amino acid content 0.5 wt %; dietary fiber content 22.7 wt %) was added at 0.1 g to 100.0 g of the white sauce and dissolved therein. This was then used as an evaluation sample for working example 13.

Comparative Example 25

Comparative example 25 was conducted in the same manner as working example 13, except that the yeast extract 2 (peptide content 22.09 wt %; RNA content 0.00 wt %; free amino acid content 1.26%; dietary fiber content 33.3 wt %) was used instead of the yeast extract 1 in working example 13. This was then used as an evaluation sample for comparative example 25.

Comparative Example 26

Comparative example 26 was conducted in the same manner as working example 13, except that the yeast extract 3 (peptide content 24.41 wt %; RNA content 11.23 wt %; free amino acid content 4.9 wt %) was used instead of the yeast extract 1 in working example 13. This was then used as an evaluation sample for comparative example 26. Composition ratios of working example 13, comparative example 25, and comparative example 26 are shown in Table 13.

TABLE 13

| Name of Ingredient | Control | Working Example 13 | Comparative Example 25 | Comparative Example 26 |
|---|---|---|---|---|
| Wheat flour | 4.00 g | 4.00 g | 4.00 g | 4.00 g |
| Butter | 4.00 g | 4.00 g | 4.00 g | 4.00 g |
| Milk | 70.0 g | 70.0 g | 70.0 g | 70.0 g |
| Chicken consommé | 0.80 g | 0.80 g | 0.80 g | 0.80 g |
| White pepper | 0.01 g | 0.01 g | 0.01 g | 0.01 g |
| Table salt | 0.10 g | 0.10 g | 0.10 g | 0.10 g |
| Water | 21.09 g | 21.09 g | 21.09 g | 21.09 g |
| Yeast Extract 1 | — | 0.1 g | — | — |
| Yeast Extract 2 | — | — | 0.1 g | — |
| Yeast Extract 3 | — | — | — | 0.1 g |
| Total | 100.0 g | 100.1 g | 100.1 g | 100.1 g |

The results of conducting the sensory analysis of food taste and comparing the evaluation samples of working example 13, comparative example 25, and comparative example 26, respectively, with the control sample were that, in working example 13, saltiness was felt to be enhanced in comparison to the control and a feeling of milk body was imparted. In comparative examples 25 and 26, savoriness was imparted as compared to the control, but a sourness-enhancing effect and a milk body-imparting effect were more strongly detected in working example 13.

INDUSTRIAL APPLICABILITY

As described above, according to the present invention, by adding the yeast extract to common processed food and drink of any flavor, sweetness, sourness, saltiness, and milk body and richness can be enhanced, depending on the processed food and drink to which the yeast extract is added, without imparting a taste that is out of place, and a volume of overall flavor can be improved. Therefore, the present invention can be favorably used not only in the common processed food and drink, but also, for example, in health foods claiming to be low in calories, sodium, and fat.

The invention claimed is:

1. A composition comprising a *Candida utilis* yeast extract or a *Saccharomyces cerevisiae* yeast extract, the yeast extract containing a peptide, RNA, dietary fiber, and free amino acids, the peptide being present in an amount of 5 wt % or more of the yeast extract, the RNA being present in an amount of 10 wt % or more of the yeast extract, the dietary fiber being present in an amount of 15 wt % or more of the yeast extract, and the free amino acids being present in an amount up to and including 4 wt % of the yeast extract, wherein the yeast extract enhances the taste of food to which it is added without imparting a savory or bitter flavor or aftertaste.

2. A method of enhancing a taste of food, wherein the composition according to claim 1 is added to a food.

3. A *Candida utilis* yeast extract or a *Saccharomyces cerevisiae* yeast extract for enhancing a taste of food, the yeast extract comprising a peptide, RNA, dietary fiber, and free amino acids, the peptide being present in an amount of 5 wt % or more, the RNA being present in an amount of 10 wt % or more, the dietary fiber being present in an amount of 15 wt % or more, and the free amino acids being present in an amount up to and including 4 wt %; and which yeast extract enhances the taste of food to which it is added without imparting a savory or bitter flavor or aftertaste.

4. An agent enhancing a taste of food, wherein the yeast extract according to claim 3 is an active ingredient.

5. The yeast extract according to claim 3, wherein the RNA is present in an amount of 25 wt % or more.

6. The yeast extract according to claim 3, which is in powder form.

7. The yeast extract according to claim 3, which enhances sweetness, saltiness, or sourness of food to which it is added.

8. A powder composition comprising a peptide, RNA, dietary fiber, and free amino acids, the peptide being present in an amount of 5 wt % or more, the RNA being present in an amount of 10 wt % or more, the dietary fiber being present in an amount of 15 wt % or more, and the free amino acids being present in an amount up to and including 4 wt %, wherein the powder composition is made from a *Candida utilis* yeast extract or a *Saccharomyces cerevisiae* yeast extract, and wherein the powder composition enhances the taste of food to which it is added without imparting a savory or bitter flavor or aftertaste.

9. The composition according to claim 1, which enhances sweetness, saltiness, or sourness of food to which it is added.

10. The composition according to claim 1, wherein the RNA is present in an amount of 25 wt % or more.

11. A method of enhancing a taste of food, wherein the yeast extract according to claim 3 is added to a food.

12. A composition comprising a *Candida utilis* yeast extract or a *Saccharomyces cerevisiae* yeast extract, the yeast extract containing protein, RNA, dietary fiber, and free amino acids, the protein being present in an amount of 5 wt % or more of the yeast extract, the RNA being present in an amount of 10 wt % or more of the yeast extract, the dietary fiber being present in an amount of 15 wt % or more of the yeast extract, and the free amino acids being present in an amount up to and including 4 wt % of the yeast extract,
wherein the yeast extract enhances the taste of food to which it is added without imparting a savory or bitter flavor or aftertaste, and
wherein a nucleolytic enzyme has not acted on the yeast extract.

13. The composition according to claim 12, wherein the RNA is present in an amount of 25 wt % or more.

* * * * *

UNITED STATES PATENT AND TRADEMARK OFFICE
CERTIFICATE OF CORRECTION

PATENT NO. : 11,096,408 B2
APPLICATION NO. : 14/240834
DATED : August 24, 2021
INVENTOR(S) : Y. Yasumatsu et al.

Page 1 of 1

It is certified that error appears in the above-identified patent and that said Letters Patent is hereby corrected as shown below:

On the Title Page

Other publications (Line 1), please change "extrats" to -- extracts --.

Other publications (Line 2), please change "Mirobiology" to -- Microbiology --.

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*